(12) United States Patent
Fukuzawa et al.

(10) Patent No.: US 8,078,173 B2
(45) Date of Patent: Dec. 13, 2011

(54) DATA TRANSFER SYSTEM, APPROACH NOTIFICATION SYSTEM AND DATA TRANSFER METHOD

(75) Inventors: Yohji Fukuzawa, Fukuoka (JP); Kousuke Sakamoto, Fukuoka (JP); Hidekazu Makino, Fukuoka (JP); Syuhei Ohsako, Fukuoka (JP); Tatsuhiko Takata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 11/976,969

(22) Filed: Oct. 30, 2007

(65) Prior Publication Data

US 2008/0153496 A1 Jun. 26, 2008

(30) Foreign Application Priority Data

Dec. 26, 2006 (JP) .................... 2006-350677

(51) Int. Cl.
*H04M 1/00* (2006.01)
(52) U.S. Cl. ............... 455/436; 455/442; 455/552.1
(58) Field of Classification Search .......... 455/403, 455/414.1, 417, 422.1, 428, 432.2, 432.3, 455/435.2, 435.3, 445, 436, 438, 441, 442, 455/443, 452.1, 452.2, 440, 552.1; 370/230, 370/431, 428, 438; 709/222, 223, 226, 227
See application file for complete search history.

(56) References Cited

U.S. PATENT DOCUMENTS

| | | | |
|---|---|---|---|
| 7,536,186 B2 * | 5/2009 | Dorenbosch et al. | 455/440 |
| 7,561,885 B2 * | 7/2009 | Hyun et al. | 455/456.1 |
| 7,672,661 B2 * | 3/2010 | Miyake et al. | 455/406 |
| 7,711,356 B2 * | 5/2010 | Ritter | 455/417 |
| 7,751,847 B2 * | 7/2010 | Karlsson | 455/522 |
| 2003/0108013 A1 * | 6/2003 | Hwang et al. | 370/335 |
| 2003/0204599 A1 | 10/2003 | Trossen | |
| 2004/0203791 A1 * | 10/2004 | Pan et al. | 455/442 |
| 2005/0013264 A1 * | 1/2005 | Sundberg | 370/328 |
| 2005/0129029 A1 * | 6/2005 | Creamer et al. | 370/395.52 |
| 2006/0126564 A1 | 6/2006 | Ramanna | |
| 2006/0160561 A1 * | 7/2006 | Uno et al. | 455/550.1 |

(Continued)

FOREIGN PATENT DOCUMENTS

EP 1443705 8/2004

(Continued)

OTHER PUBLICATIONS

Extended European Search Report dated Nov. 23, 2009 received corresponding EP Patent Application No. 07119735.4-2413/1944912.

(Continued)

*Primary Examiner* — Jean Gelin
(74) *Attorney, Agent, or Firm* — Fujitsu Patent Center

(57) ABSTRACT

A data transfer system includes a data conversion storage server (3) that generates data (MD1) having a size smaller than a size of data (MD0) received from a delivery server (5) by performing a specific process on the data (MD0). A base station control unit (2) is provided with a data transferring portion that transfers one of the data (MD0 and MD1) selectively to a mobile phone terminal (1), and an approaching mobile communication equipment sensing portion that senses a mobile phone terminal (1) that is receiving the data (MD0) and is approaching an HSDPA supporting wireless base station (4). Then, the data transferring portion stops sending the data (MD0) to the mobile phone terminal (1) sensed by the approaching mobile communication equipment sensing portion, and instead it starts transferring data (MD2) related to a part of the first data to be transferred.

8 Claims, 16 Drawing Sheets

U.S. PATENT DOCUMENTS

| | | | |
|---|---|---|---|
| 2006/0240831 A1* | 10/2006 | Toskala et al. | 455/436 |
| 2007/0060187 A1* | 3/2007 | Englund et al. | 455/522 |
| 2007/0173257 A1* | 7/2007 | Bakker et al. | 455/442 |
| 2008/0039088 A1 | 2/2008 | Fukushima et al. | |

FOREIGN PATENT DOCUMENTS

| | | |
|---|---|---|
| EP | 1615401 | 1/2006 |
| EP | 1653673 | 5/2006 |
| JP | 2002-238074 A | 8/2002 |
| JP | 2004-248202 A | 9/2004 |
| JP | 2005-348166 A | 12/2005 |
| JP | 2006-500808 | 1/2006 |
| JP | 2006-503463 | 1/2006 |
| JP | 2006-270777 A | 10/2006 |
| JP | 2006-345251 A | 12/2006 |
| WO | WO 2004-028095 | 1/2004 |
| WO | WO 2004-036824 | 4/2004 |

OTHER PUBLICATIONS

Dapeng Wu et al Scalable Video Coding and Transport over Boad-Band Wireless Networks Proceedings of the IEEE, IEEE. New York, US, vol. 89, No. 1, Jan. 1, 2001, XP011044473 ISSN: 0018-9219 section IV.

Dick M et al: "Adaptive Transcoding Proxy Architecture for Video Streaming in Mobile Networks" Image Processing. 2005. ICIP 2005. IEEE International Conference on Genova, Italy Sep. 11-14, 2005, Piscataway, NJ, USA, IEEE, vol. 3, Sep. 11, 2005, pp. 700-703, XP010851487 ISBN: 978-0-7803-9134-5 section 3.

Jianfei C AI et al: Ubiquitous Video Streaming Through Wireless Overlay Networks Intelligent Signal Processing and Communication Systems, 2005. ISPACS 2005. Proceedings of 2005 International Symposium on Hong Kong Dec. 13-16, 2005, Piscataway, NJ, USA, IEEE, Dec. 13, 2005, pp. 797-800, XP010894720 SBN: 978-0-7803-9266-3 sections 1 and 4.

First Notification of Office Action dated Jun. 12, 2010 received in corresponding Chinese Patent Application No. 200710186990.2.

"CN Official Communication", mailed by Chinese Patent Office and corresponding to Chinese application No. 200710186990.2 on Feb. 23, 2011, with English translation.

Japanese Notification of Reason(s) for Refusal, Partial English-language translation, dated Dec. 21, 2010 for corresponding Japanese Patent Application No. 2006-350677.

* cited by examiner

| TRANSMISSION SPEED (kbps) | DELIVERY BIT RATE (kbps) |
|---|---|
| $0 < S \leqq 100$ | 12kbps |
| $100 < S \leqq 200$ | 32kbps |
| $200 < S \leqq 400$ | 128kbps |
| ⋮ | ⋮ |
| $S \geqq 1000$ | 384kbps |

| EMPTY / OCCUPIED | TERMINAL IDENTIFICATION NUMBER | DELIVERY METHOD | DELIVERY BIT RATE |
|---|---|---|---|
| EMPTY | — | — | — |
| OCCUPIED | 0x12345 | CONTINUE WITH LOWERED IMAGE QUALITY | 32kbps |
| OCCUPIED | 0x13567 | STORE IN SERVER | — |
| OCCUPIED | 0x23123 | DELIVER ONLY SOUNDS | — |
| EMPTY | — | — | — |
| ... | ... | ... | ... |

| TERMINAL IDENTIFICATION NUMBER | USED CELL IDENTIFICATION NUMBER | COMMUNICATION STATE | ... | DELIVERY METHOD | |
|---|---|---|---|---|---|
| 0x12345 | 0x01 | PACKET HIGH SPEED COMMUNICATION | ... | CONTINUE WITH LOWERED IMAGE QUALITY | ~8A |
| 0x23123 | 0x02 | PACKET LOW SPEED COMMUNICATION | ... | DELIVER ONLY SOUNDS | ~8A |
| 0x13567 | 0x01 | PACKET HIGH SPEED COMMUNICATION | ... | STORE IN SERVER | ~8A |
| 0x14142 | 0x03 | PACKET HIGH SPEED COMMUNICATION | ... | CONTINUE WITH LOWERED IMAGE QUALITY | ~8A |
| 0x98765 | 0x02 | PACKET LOW SPEED COMMUNICATION | ... | STORE IN SERVER | ~8A |
| ... | ... | ... | ... | ... | | ns
DATA TRANSFER SYSTEM, APPROACH NOTIFICATION SYSTEM AND DATA TRANSFER METHOD

BACKGROUND OF THE INVENTION

1. Field of the Invention

The present invention relates to a system, a method and the like for transferring multimedia data or the like from a delivery server to mobile communication equipment in a mobile communication system using a technique such as a mobile phone system, a PHS, a wireless LAN or the like.

2. Description of the Prior Art

In a mobile communication system using W-CDMA (Wideband Code Division Multiple Access), there is proposed a technique called "HSDPA (High Speed Downlink Packet Access)" for improving a speed of communication to mobile communication equipment (a terminal device), i.e., a downlink communication speed.

The HSDPA can realize high speed and high efficiency of downlink communication without a large change of technical specifications of W-CDMA. Although the downlink communication speed is 2 Mbps at most in the current W-CDMA, it can be improved up to approximately 14 Mbps by using HSDPA.

If HSDPA becomes commonplace in the future, it is predicted that services of delivering content including high resolution moving images that need a high bit rate will become widespread though it is difficult with the conventional technique.

In order to deliver content including high resolution moving images to mobile communication equipment by using HSDPA, there are following problems to be solved.

For the time being after starting a communication service by using HSDPA, cells where the communication service is available will increase gradually. Therefore, there will be mixed cells where the communication service is available and conventional cells.

Therefore, when a user moves from an HSDPA cell to a conventional cell, it may cause a situation where the mobile communication equipment cannot receive the content smoothly. In this case, the content may not be provided as the user wants.

Therefore, it is considered to use the method as described in PCT Application No. PCT/FI2003/000686 or No. PCT/FI2003/000752. According to the method described in PCT Application No. PCT/FI2003/000686, a data transmission bit rate from a streaming server is changed in accordance with a downlink communication speed.

According to the method described in PCT Application No. PCT/FI2003/000752, after reselection of a cell, a mobile client device requests a streaming server to resend streaming media that cannot be received due to the reselection of the cell.

However, the conventional method described in PCT Application No. PCT/FI2003/000686 or No. PCT/FI2003/000752 may increase a load on the streaming server since the request is issued to the streaming server. If the load on the streaming server becomes excessive, delivery of data cannot be performed smoothly.

SUMMARY OF THE INVENTION

An object of the present invention is to provide a system and a method for performing delivery of data more smoothly than the conventional system and method also in a mobile communication system where cells that support a high speed communication standard such as HSDPA and conventional cells are mixed, so that content can be provided as users want.

A data transfer system according to one aspect of the present invention is a data transfer system used in a mobile communication system that is made up of a first wireless base station that performs communication with mobile communication equipment based on a first communication standard and a second wireless base station that performs communication with mobile communication equipment based on a second communication standard that has a speed lower than a speed of the first communication standard. The data transfer system includes a reduced data generating portion that generates second data having a size smaller than a size of first data received from a server by performing a specific process on the first data, a data transferring portion that transfers one of the first data and the second data related to the first data generated by the reduced data generating portion selectively to the mobile communication equipment, and an approaching mobile communication equipment sensing portion that senses mobile communication equipment that is receiving the first data and approaching the second wireless base station. The data transferring portion stops transferring the first data to the mobile communication equipment that is sensed by the approaching mobile communication equipment sensing portion, and instead it starts transferring the second data generated by the reduced data generating portion related to a part of the first data to be transferred.

Alternatively, the data transfer system includes a relaying portion that relays data delivered from a server to mobile communication equipment, an approaching mobile communication equipment sensing portion that senses mobile communication equipment that is receiving the data and is approaching the second wireless base station, a relay stop controlling portion that controls the relaying portion to stop relaying the data to the mobile communication equipment sensed by the approaching mobile communication equipment sensing portion, a storing portion that stores a remaining part of the data delivered from the server for the mobile communication equipment after the relaying portion stopped relaying the data to the mobile communication equipment, a handover mobile communication equipment sensing portion that senses the mobile communication equipment that is handed over from the second wireless base station to the first wireless base station among the mobile communication equipment sensed by the approaching mobile communication equipment sensing portion, and a relay restart controlling portion that controls the relaying portion to relay a remaining part of the data stored in the storing portion for the mobile communication equipment to the mobile communication equipment sensed by the handover mobile communication equipment sensing portion.

An approach notification system according to another aspect of the present invention is an approach notification system used in a mobile communication system that is made up of a first wireless base station that performs communication with mobile communication equipment based on a first communication standard and a second wireless base station that performs communication with mobile communication equipment based on a second communication standard that has a speed lower than a speed of the first communication standard. The approach notification system includes an approaching mobile communication equipment sensing portion that senses mobile communication equipment that is performing communication with the first wireless base station and is approaching the second wireless base station, and an approach notifying portion that notifies the mobile communication equipment sensed by the approaching mobile communication equipment sensing portion about its approaching the second wireless base station.

According to the present invention, delivery of data can be performed more smoothly than the conventional system, and content can be provided as a user wants also in a mobile communication system in which cells supporting a new high speed communication standard such as HSDPA and cells supporting only the conventional standard are mixed.

BRIEF DESCRIPTION OF THE DRAWINGS

FIG. 5 is a diagram showing an example of a moving image conversion definition database.

FIG. 6 is a diagram showing an example of a moving image conversion area reservation database.

FIG. 8 is a diagram showing an example of a busy terminal information management database.

DESCRIPTION OF THE PREFERRED EMBODIMENTS

The invention will now be described in detail with reference to the attached drawings.

Figure 1:
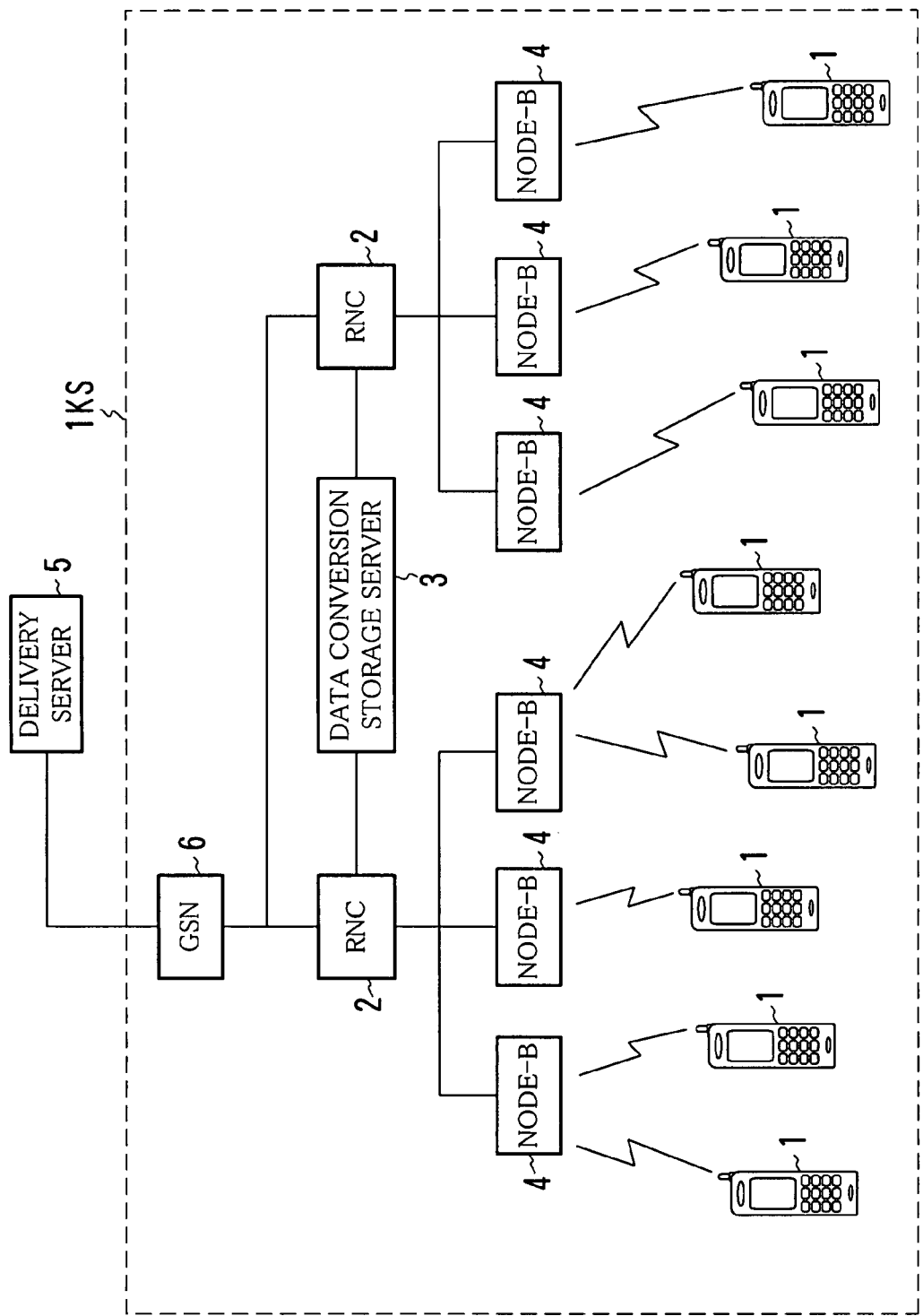
FIG. 1 is a diagram showing an example of a general structure of a mobile phone system.
Figure 2:
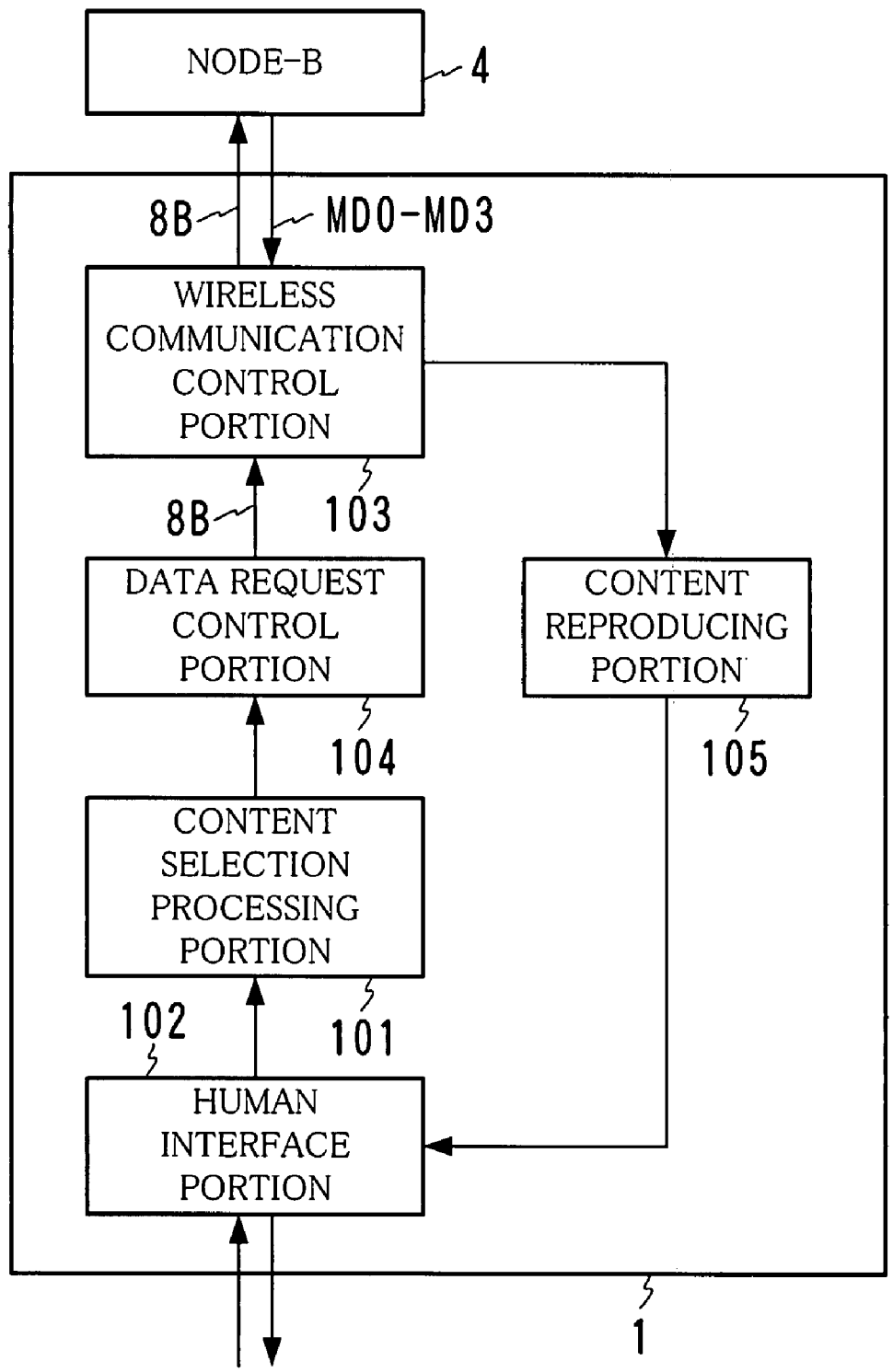
FIG. 2 is a diagram showing an example of a structure of a mobile phone terminal.
Figure 3:
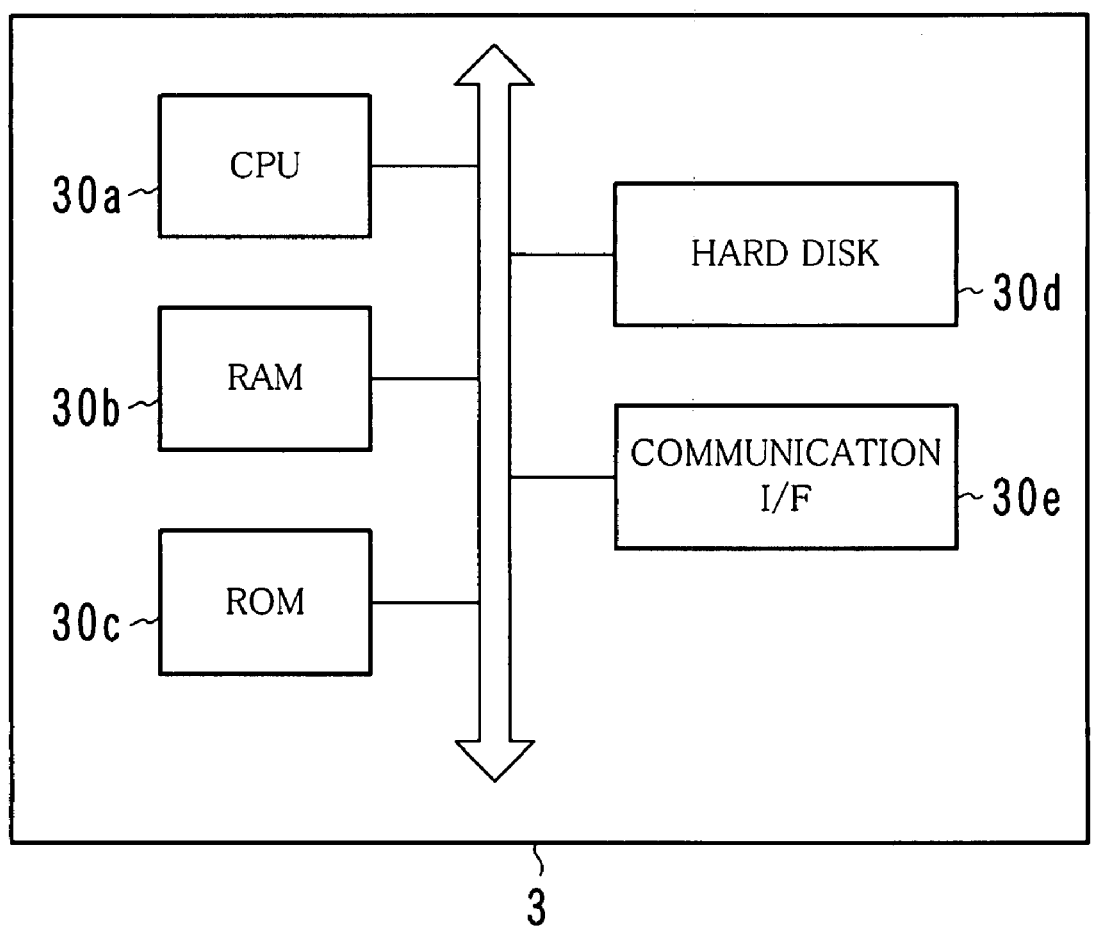
FIG. 3 is a diagram showing an example of a hardware structure of a data conversion storage server.
Figure 4:
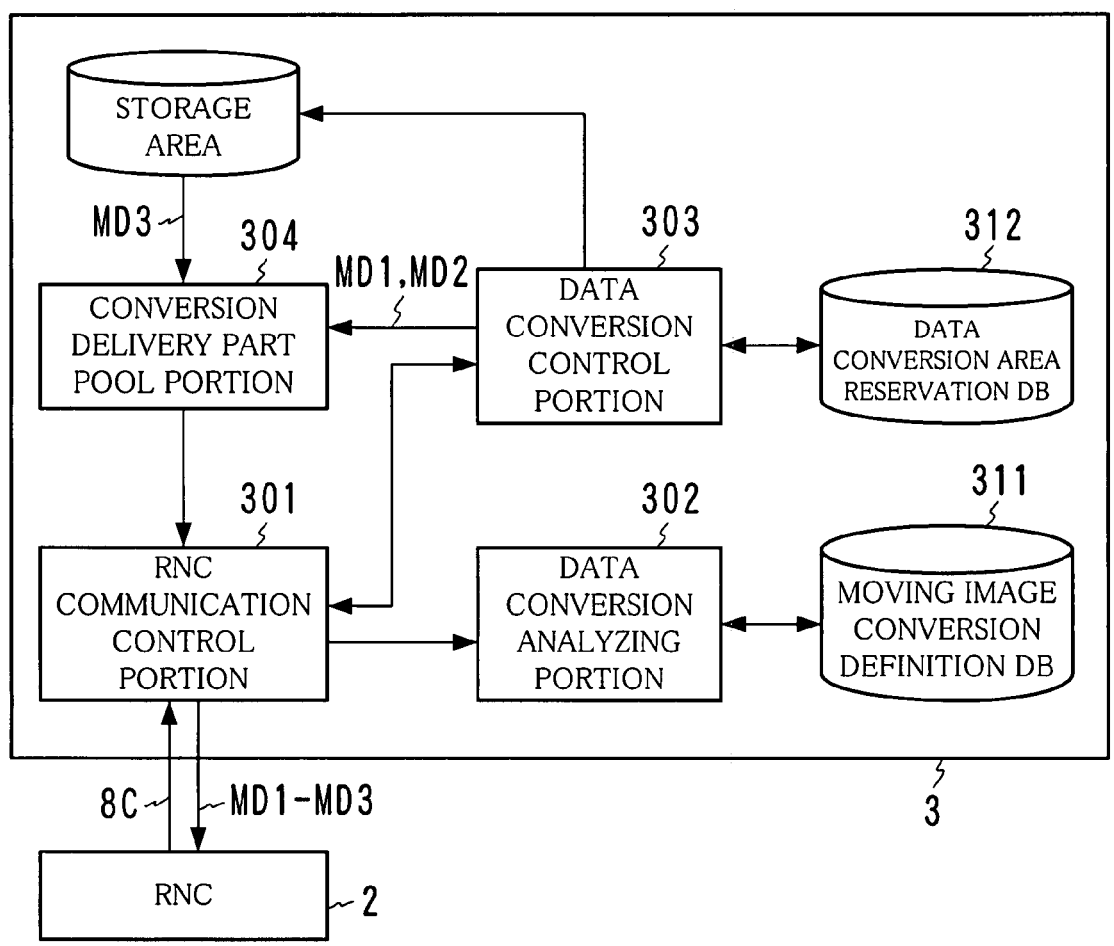
FIG. 4 is a diagram showing an example of a functional structure of the data conversion storage server.
Figure 7:
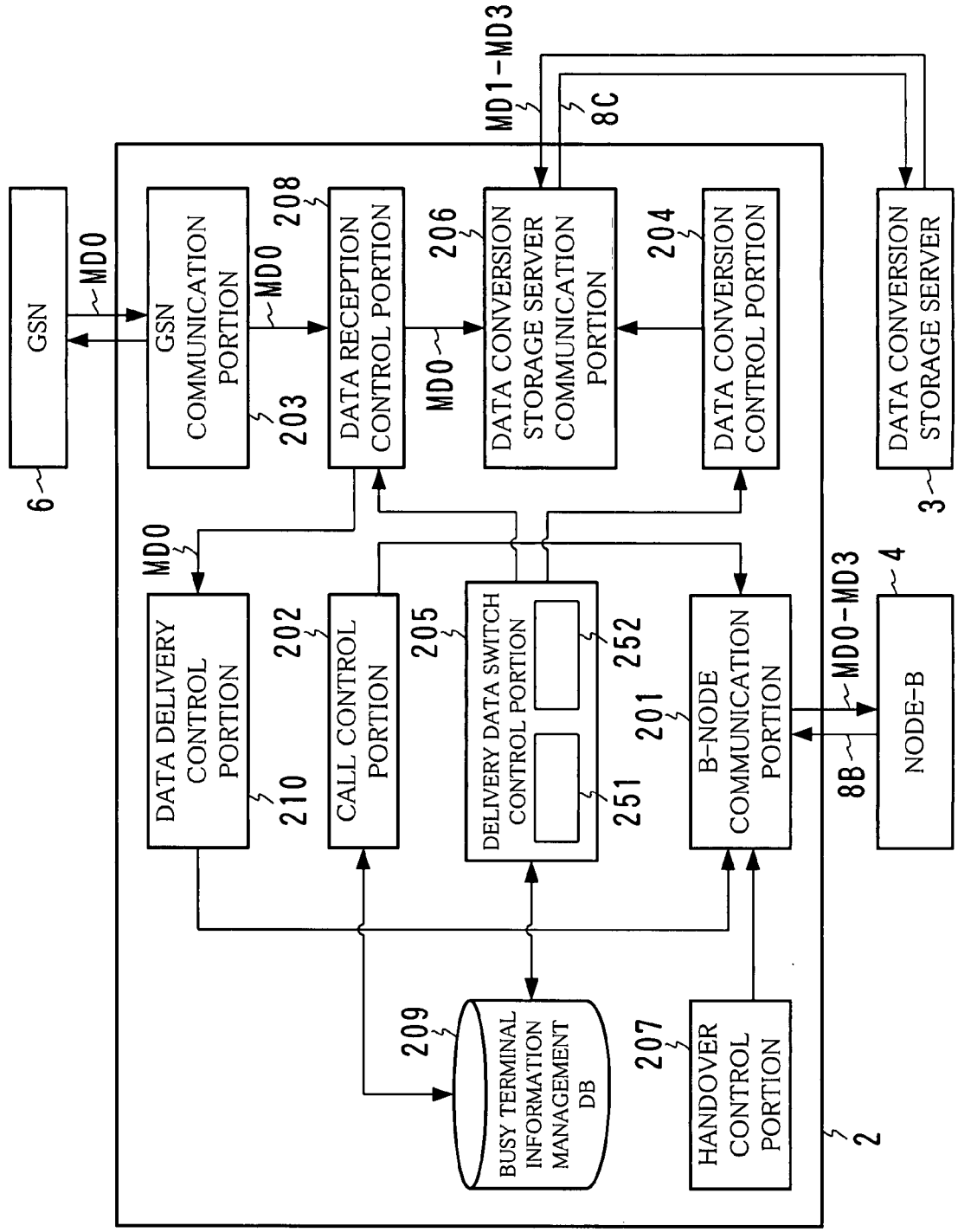
FIG. 7 is a diagram showing an example of a structure of a base station control unit.

FIG. 1 is a diagram showing an example of a general structure of a mobile phone system 1KS, FIG. 2 is a diagram showing an example of a structure of a mobile phone terminal 1, FIG. 3 is a diagram showing an example of a hardware structure of a data conversion storage server 3, FIG. 4 is a diagram showing an example of a functional structure of the data conversion storage server 3, FIG. 5 is a diagram showing an example of a moving image conversion definition database 311, FIG. 6 is a diagram showing an example of a moving image conversion area reservation database 312, FIG. 7 is a diagram showing an example of a structure of a base station control unit 2, and FIG. 8 is a diagram showing an example of a busy terminal information management database 209.

As shown in FIG. 1, the mobile phone system 1KS is a mobile communication system based on the standard of W-CDMA (Wideband Code Division Multiple Access), which is made up of a mobile phone terminal 1, a base station control unit 2, a data conversion storage server 3, a wireless base station 4, a GPRS support node 6 and the like.

The GPRS support node 6 performs data exchange between the base station control unit 2 and an external network (e.g., an IP network such as the Internet or a network of a mobile communication system of other carrier), in the same manner as the conventional one. It may be called a "GSN" in an abbreviation. In particular, in the present embodiment, it performs a process of relaying moving image and audio data sent from a delivery server 5, i.e., multimedia content data to the mobile phone terminal 1 and a process of relaying a request for multimedia content from the mobile phone terminal 1 to the delivery server 5.

Note that the delivery server 5 is a streaming server that delivers multimedia content data such as a movie, a concert, a sport live, news, a lecture or the like. Hereinafter, data for reproducing multimedia content is referred to as "multimedia data". Since the delivery server 5 delivers the multimedia data by using a streaming technique, the mobile phone terminal 1 that will be described later reproduces the multimedia content not after the entire multimedia data is downloaded but while downloading it.

The wireless base station 4 performs transmission and reception of a wireless signal with the mobile phone terminal 1 in accordance with a control signal from the base station control unit 2 in the same manner as the conventional one. It may be called a "Node-B", a "base station", a "wireless station", a "BS (Base Station)", a "BTS (Base Transceiver Station)" or the like. The mobile phone system 1KS includes wireless base stations 4 that perform communication by HSDPA (High Speed Downlink Packet Access) and wireless base stations 4 that do not support HSDPA, which are mixed. Hereinafter, the wireless base station 4 that performs communication by HSDPA and the wireless base station 4 that does not support HSDPA may be referred to as an "HSDPA supporting wireless base station 4H" and an "HSDPA non-supporting wireless base station 4N", respectively, in a distinguished manner.

The HSDPA non-supporting wireless base station 4N can transmit data to the mobile phone terminal 1 at only 2 Mbps at most, while the HSDPA supporting wireless base station 4H can transmit data to the mobile phone terminal 1 at approximately 14 Mbps at most.

The mobile phone terminal 1 is a terminal device used by a user. It may be called "mobile communication equipment", a "moving station", an "MS (Mobile Station)" or the like.

The mobile phone terminal 1 is made up of a content selection processing portion 101, a human interface portion 102, a wireless communication control portion 103, a data request control portion 104, a content reproducing portion 105 and the like, as shown in FIG. 2.

The wireless communication control portion 103 is a module that performs communication with the wireless base station 4. The human interface portion 102 is an HMI (Human Machine Interface) made up of a liquid crystal panel, a speaker, a microphone, an operating button and the like. The wireless communication control portion 103 and the human interface portion 102 are the same as those that are provided to the conventional MS.

The content selection processing portion 101 obtains information such as a title or the like of multimedia content from the delivery server 5 and displays a listing screen for the user to select multimedia content to be delivered on an operating panel of the human interface portion 102.

The data request control portion 104 requests the delivery server 5 via the wireless base station 4 of the cell in which the mobile phone terminal 1 is currently located to deliver multimedia data of the multimedia content that the user selected in the listing screen.

The process described above performed by the data request control portion 104 and the content selection processing portion 101 is realized by a CPU that executes an application program in the same manner as the conventional system. Further in the present embodiment, the content selection processing portion 101 displays on the operating panel a screen for the user to select which method is used for receiving delivery of remaining multimedia data when the mobile phone terminal 1 moves in the cell of the HSDPA non-supporting wireless base station 4N during receiving delivery of the multimedia data. The data request control portion 104 sends delivery method data 8B indicating a delivering method selected by the user, via the wireless base station 4 to the base station control unit 2. These processes are also realized by the application program.

The content reproducing portion 105 reproduces the multimedia content by using the multimedia data received by the wireless communication control portion 103. The content reproducing portion 105 is realized by an existing application program.

The user can designate any one of the following methods, (Method A) to (Method C) as the delivering method when the mobile phone terminal 1 moves in a cell of the HSDPA non-supporting wireless base station 4N.

(Method A) Continue with lowered image quality: to receive delivery of the multimedia data by lowering image quality of moving images on the multimedia content.

(Method B) Receive only sounds: to receive delivery of only sounds in the multimedia content. In other words, moving images are cut off.

(Method C) Store in the server: to stop receiving the multimedia data temporarily during communication with the HSDPA non-supporting wireless base station 4N, and the succeeding part is stored in the data conversion storage server 3. When it becomes possible to communicate with the HSDPA supporting wireless base station 4H again, reception of delivery of the multimedia data is restarted from the stored part.

With reference to FIG. 1 again, the data conversion storage server 3 performs a process for realizing the above-mentioned methods (Method A) to (Method C). More specifically, it performs a process of reducing the multimedia data for the mobile phone terminal 1 that cannot perform high speed communication because it is communicating with the HSDPA non-supporting wireless base station 4N by lowering image quality of the moving image or by cutting the moving image to be only sound data. Alternatively, it performs a process of storing the multimedia data and delivering the multimedia data with maintained quality after the mobile phone terminal 1 restarts communication with the HSDPA supporting wireless base station 4H.

The data conversion storage server 3 is made up of a CPU 30a, a RAM 30b, a ROM 30c, a hard disk 30d, a communication interface 30e and the like as shown in FIG. 3.

The communication interface 30e is an NIC (Network Interface Card) or a wireless communication module for communicating with the base station control unit 2.

The ROM 30c or the hard disk 30d stores installed computer programs and data for realizing functions of an RNC communication control portion 301, a data conversion analyzing portion 302, a data conversion control portion 303, a conversion delivery part pool portion 304, a moving image conversion definition database 311, a data conversion area reservation database 312 and the like as shown in FIG. 4. These computer programs and data are loaded to the RAM 30b if necessary, and the computer programs are executed by the CPU 30a.

In FIG. 4, the RNC communication control portion 301 controls the communication interface 30e for performing communication with the base station control unit 2.

The moving image conversion definition database 311 stores data defining what delivery bit rate is preferable to send the multimedia data at what communication speed (transmission speed), as shown in FIG. 5.

Note that content of the moving image conversion definition database 311 are set or modified by a maintenance person in accordance with a statistical result of information concerning the network such as a traffic of downlink communication from the wireless base station 4 to the mobile phone terminal 1 or the like. The delivery bit rate with respect to the transmission speed is preferably set with a margin to be a little lower value.

The data conversion analyzing portion 302 decides what process is to be performed on the multimedia data by analyzing information provided from the base station control unit 2. In addition, in accordance with a result thereof, it makes the data conversion control portion 303 or the conversion delivery part pool portion 304 perform the process as follows.

The data conversion control portion 303 performs a process of registering a reservation of a codec or storage of the multimedia data in the data conversion area reservation database 312. Furthermore, it retrieves a reservation of a codec and performs the codec. In particular, image quality of the moving image is lowered, or the moving image is cut off to leave only sound portion, so as to perform the codec of downsizing the multimedia data. In addition, stored reservation is retrieved so as to perform the process of storing the multimedia data in a predetermined storage area.

The data conversion area reservation database 312 includes data indicating what multimedia data is delivered to which mobile phone terminal 1 as shown in FIG. 6.

The conversion delivery part pool portion 304 gives instructions to the RNC communication control portion 301 so that multimedia data coded by the data conversion control portion 303 or the stored multimedia data is delivered to the mobile phone terminal 1.

The detailed process contents of individual portions shown in FIG. 4 are different depending on the method among (Method A) to (Method C) designated by the user of the mobile phone terminal 1. This will be described later.

With reference to FIG. 1 again, the base station control unit 2 controls the wireless base station 4 so that setting of wireless channel to the mobile phone terminal 1 that starts speech communication (call connection control), control of handover when the mobile phone terminal 1 moves, diversity handover control, release of the channel (termination control) and the like are performed, in the same manner as the conventional system. The base station control unit 2 may also be called an "RNC (Radio Network Controller)" or a "BSC (Base Station Controller)".

In addition, the base station control unit 2 performs a process of relaying the multimedia data sent from the delivery server 5 to the mobile phone terminal 1. In addition, if necessary, it makes the data conversion storage server 3 perform a process on the multimedia data and relays the multimedia data to the mobile phone terminal 1.

The base station control unit 2 is provided with a B-Node communication portion 201, a call control portion 202, a GSN communication portion 203, a data conversion control portion 204, a delivery data switch control portion 205, a data conversion storage server communication portion 206, a handover control portion 207, a data reception control portion 208, a busy terminal information management database 209, a data delivery control portion 210 and the like as shown in FIG. 7. The whole or a part of them may be realized by only hardware or by software executed by the CPU to control hardware.

The GSN communication portion 203 performs communication with the GPRS support node 6 (GSN). The B-Node communication portion 201 performs communication with the wireless base station 4 (B Node). The call control portion 202 controls call connection. The handover control portion 207 performs switching of the wireless base station 4 that performs communication with the mobile phone terminal 1, i.e., handover control when the mobile phone terminal 1 moves.

The data conversion storage server communication portion 206 is a hardware module that performs communication with the data conversion storage server 3.

The data conversion control portion 204 performs control for making the data conversion storage server 3 perform a process for converting the multimedia data or a process of storage.

The delivery data switch control portion 205 performs a process of switching the multimedia data to be sent to the mobile phone terminal 1. Further, the delivery data switch control portion 205 includes a first sensing portion 251 for sensing that the mobile phone terminal 1 communicating with the HSDPA supporting wireless base station 4H is approaching the HSDPA non-supporting wireless base station 4N or is handed over, and a second sensing portion 252 for sensing that the mobile phone terminal 1 communicating with the HSDPA non-supporting wireless base station 4N is approaching the HSDPA supporting wireless base station 4H or is handed over.

The data reception control portion 208 sends out the data that is sent from the upper node, i.e., the GPRS support node 6 and is received by the GSN communication portion 203 to the data delivery control portion 210 or the data conversion storage server communication portion 206.

The data delivery control portion 210 controls the B-Node communication portion 201 so that the multimedia data is delivered to the mobile phone terminal 1.

The busy terminal information management database 209 stores terminal management data 8A for each mobile phone terminal 1 that is currently communicating with the wireless base station 4 under the base station control unit 2 as shown in FIG. 8.

In the terminal management data 8A, "terminal identification number" is identification information for discriminating the mobile phone terminal 1 related to the terminal management data 8A from other mobile phone terminals 1. "Used cell identification number" is identification information for discriminating the cell of the wireless base station 4 with which the mobile phone terminal 1 is currently communicating from cells of other wireless base stations 4.

"Communication state" indicates a state of downlink communication that the mobile phone terminal 1 is currently performing. If "communication state" is "packet high speed communication", it means that the mobile phone terminal 1 is now performing communication by HSDPA, i.e., high speed communication. If it is "packet low speed communication", it means that the mobile phone terminal 1 is now performing communication without HSDPA, i.e., low speed communication. In other words, if the "communication state" is the "packet high speed communication", it is understood that the mobile phone terminal 1 is performing packet communication with the HSDPA supporting wireless base station 4H. If it is the "packet low speed communication", it is understood that it is performing packet communication with the HSDPA non-supporting wireless base station 4N.

"Moving image delivering method" indicates what method is used for receiving delivery of the multimedia data if the mobile phone terminal 1 cannot perform communication by HSDPA, i.e., if it is located in a cell of the HSDPA non-supporting wireless base station 4N.

When new communication is started between the wireless base station 4 under the base station control unit 2 and the mobile phone terminal 1, the terminal management data 8A of the mobile phone terminal 1 is registered in the busy terminal information management database 209. Note that a value of "delivering method" of the terminal management data 8A is based on the delivering method data 8B that is sent from the mobile phone terminal 1.

In addition, a value of "used cell identification number" of the terminal management data 8A is updated every time when the other end with which the mobile phone terminal 1 performs communication is handed over to other wireless base station 4 under the base station control unit 2. In addition, if a state of the communication speed or the like is changed when it is handed over, a value of "communication state" is updated in line with it.

However, if the other end of the communication is changed (handed over) to the wireless base station 4 under other base station control unit 2, the terminal management data 8A is erased from the busy terminal information management database 209. Instead, the terminal management data 8A of the mobile phone terminal 1 is newly registered in the busy terminal information management database 209 of the other base station control unit 2.

In addition, if the mobile phone terminal 1 finished the communication, the terminal management data 8A of the mobile phone terminal 1 is also erased from the busy terminal information management database 209.

Next, contents of processes performed by individual portions of the base station control unit 2 and the data conversion storage server 3 when the multimedia data sent from the delivery server 5 is relayed to the mobile phone terminal 1 will be described more in detail.

[Process when Delivery of Multimedia Data is Started]

Figure 9:
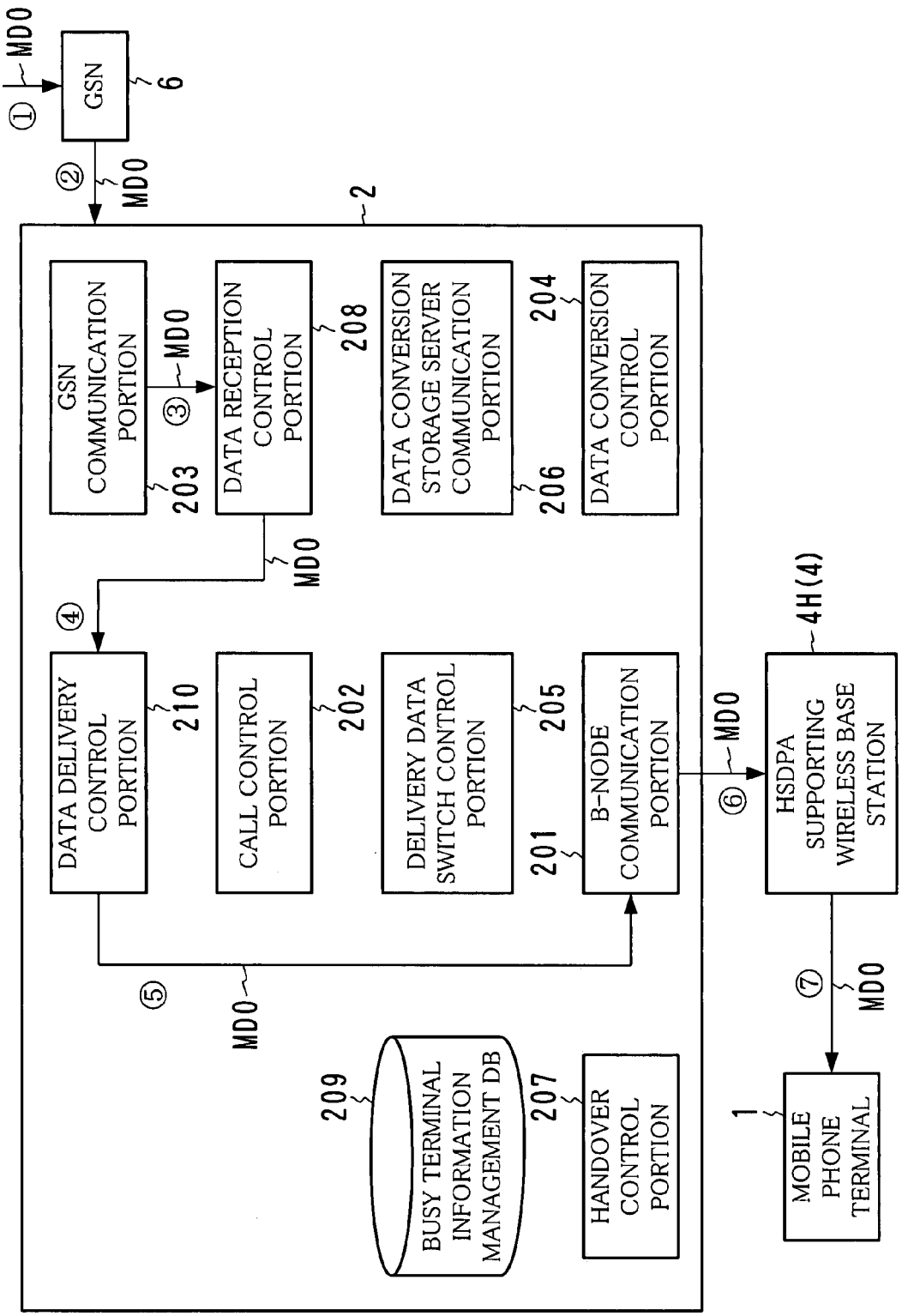
FIG. 9 is a diagram showing an example of a flow of a process of multimedia data before the mobile phone terminal approaches an HSDPA non-supporting wireless base station.

FIG. 9 is a diagram showing an example of a flow of a process of multimedia data MD0 before the mobile phone terminal 1 approaches the HSDPA non-supporting wireless base station 4N.

As described above, the user selects a delivering method in low speed communication before receiving delivery of multimedia data from the delivery server 5. Then, the delivering method data 8B indicating the delivering method is sent to the base station control unit 2 that controls the HSDPA supporting wireless base station 4H that is now performing communication with the mobile phone terminal 1 of the user. The delivering method indicated in the delivering method data 8B is registered in "delivering method" in the terminal management data 8A of the mobile phone terminal 1 stored in the busy terminal information management database 209 of the base station control unit 2.

Then, in the same manner as the conventional system, the multimedia data sent out from the delivery server 5 is received by the mobile phone terminal 1 via the GPRS support node 6, the GSN communication portion 203 of the base station control unit 2, the data reception control portion 208, the data delivery control portion 210, the B-Node communication portion 201 and the HSDPA supporting wireless base station 4H in the order shown in FIG. 9 with circled numbers. Then, the mobile phone terminal 1 reproduces the multimedia content based on the received multimedia data and displays the moving image on the liquid crystal panel while it produces sounds from the speaker.

Hereinafter, the multimedia data sent out from the delivery server 5 is referred to as "multimedia data MD0".

After that, when the mobile phone terminal 1 that is under communication with the HSDPA supporting wireless base station 4H moves, it may approach a cell of the HSDPA non-supporting wireless base station 4N.

[Process of Preparing for Switching Delivering Method]

In the base station control unit 2, the delivery data switch control portion 205 senses that the mobile phone terminal 1 communicating with the HSDPA supporting wireless base station 4H is approaching the HSDPA non-supporting wireless base station 4N. For example, if intensity of the radio wave that the HSDPA non-supporting wireless base station 4N received from the mobile phone terminal 1 becomes a predetermined value or larger, it should be sensed that the mobile phone terminal 1 is approaching the HSDPA non-supporting wireless base station 4N. Alternatively, it may be sensed based on the fact that the handover control portion 207 makes the mobile phone terminal 1 hand over from the HSDPA supporting wireless base station 4H to the HSDPA non-supporting wireless base station 4N.

When the delivery data switch control portion 205 sensed that it is approaching the HSDPA non-supporting wireless base station 4N, it notifies the mobile phone terminal 1 about that the delivering method of the multimedia data will be changed, and it instructs the data conversion storage server 3 to perform a process for changing the delivering method. On this occasion, it sends to the data conversion storage server 3 delivery change attribution data 8C indicating the delivering method and the terminal identification number indicated in the terminal management data BA of the mobile phone terminal 1 and the downlink communication speed from the HSDPA non-supporting wireless base station 4N that the mobile phone terminal 1 approaches.

In the data conversion storage server 3, when the RNC communication control portion 301 received the delivery change attribution data 8C, the data conversion analyzing portion 302 analyzes the delivery change attribution data 8C as follows, and the data conversion control portion 303 performs reservation of codec or storage of the multimedia data MD0 in the moving image conversion area reservation database 312 in accordance with a result of the analysis.

The data conversion analyzing portion 302 checks the delivering method indicated in the delivery change attribution data 8C.

If the delivering method is "continue with lowered image quality", the downlink communication speed indicated in the delivery change attribution data 8C is further verified with the moving image conversion definition database 311 shown in FIG. 5 so that a delivery bit rate of the multimedia data that is suitable for the communication speed is decided. Then, a vacant image conversion area (area, record) in the moving image conversion area reservation database 312 is searched, and information indicating the terminal identification number and the delivering method indicated in the delivery change attribution data 8C and the decided delivery bit rate is stored in the image conversion area. Thus, the reservation is completed.

For example, if a downlink transmission speed of the HSDPA non-supporting wireless base station 4N that the mobile phone terminal 1 approaches is "128 kbps", the delivery bit rate is decided to be "32 kbps" from the record of "100<S≦200".

If the delivering method is "deliver only sounds" or "store in server", the information indicating the terminal identification number indicated in the delivery change attribution data 8C and the delivering method is stored in a vacant image conversion area in the moving image conversion area reservation database 312. Thus, the reservation is completed. Calculation of the delivery bit rate is not performed.

When the reservation is completed, resources for conversion or storage of the multimedia data MD0 is secured in the data conversion storage server 3. Thus, preparation for switching the delivering method is completed.

[Switch of Delivering Method]

Figure 10:
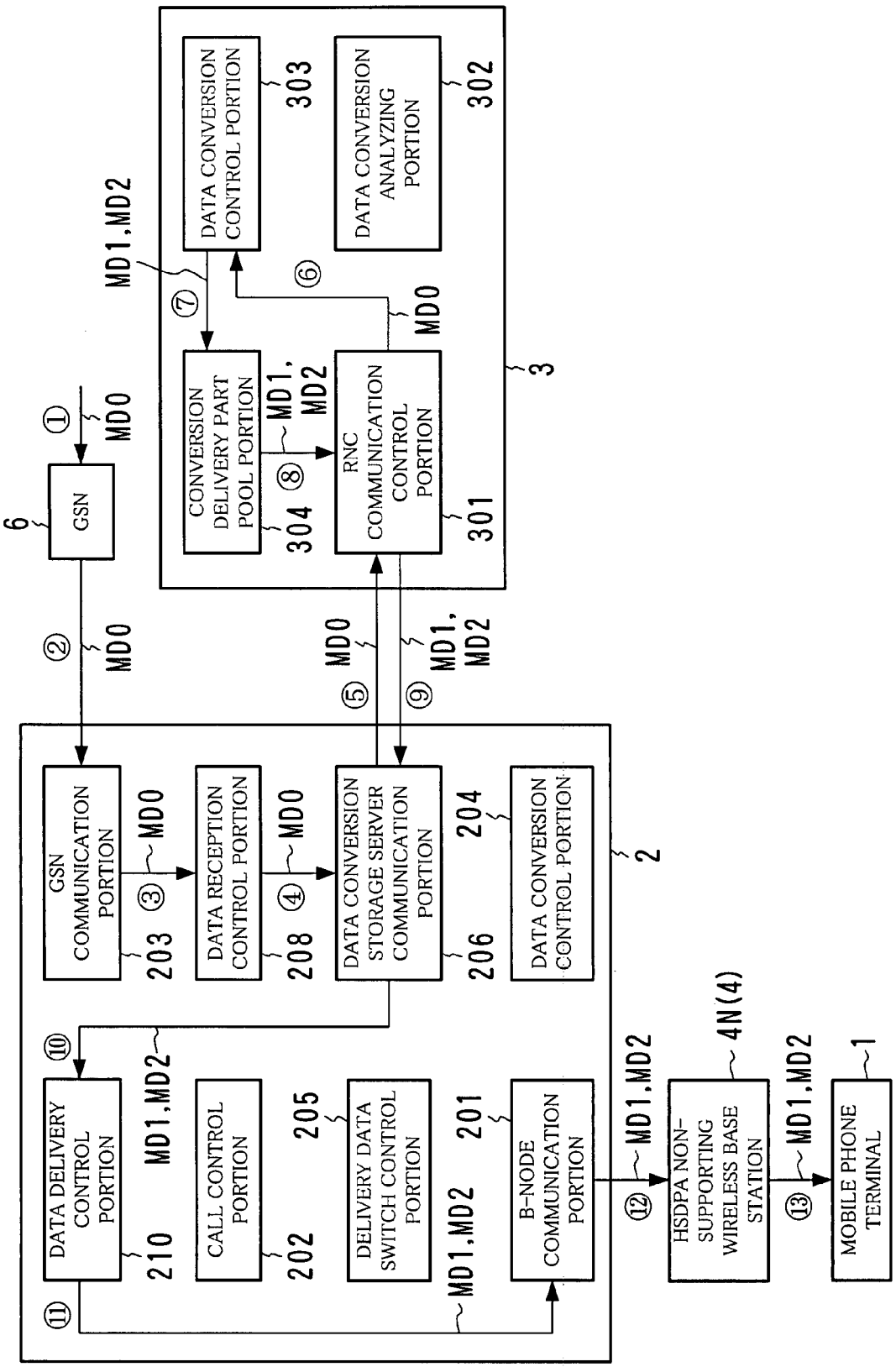
FIG. 10 is a diagram showing an example of a flow of a process of the multimedia data in the period after detection of the approach of the mobile phone terminal to the HSDPA non-supporting wireless base station until handover to an HSDPA supporting wireless base station again.
Figure 11:
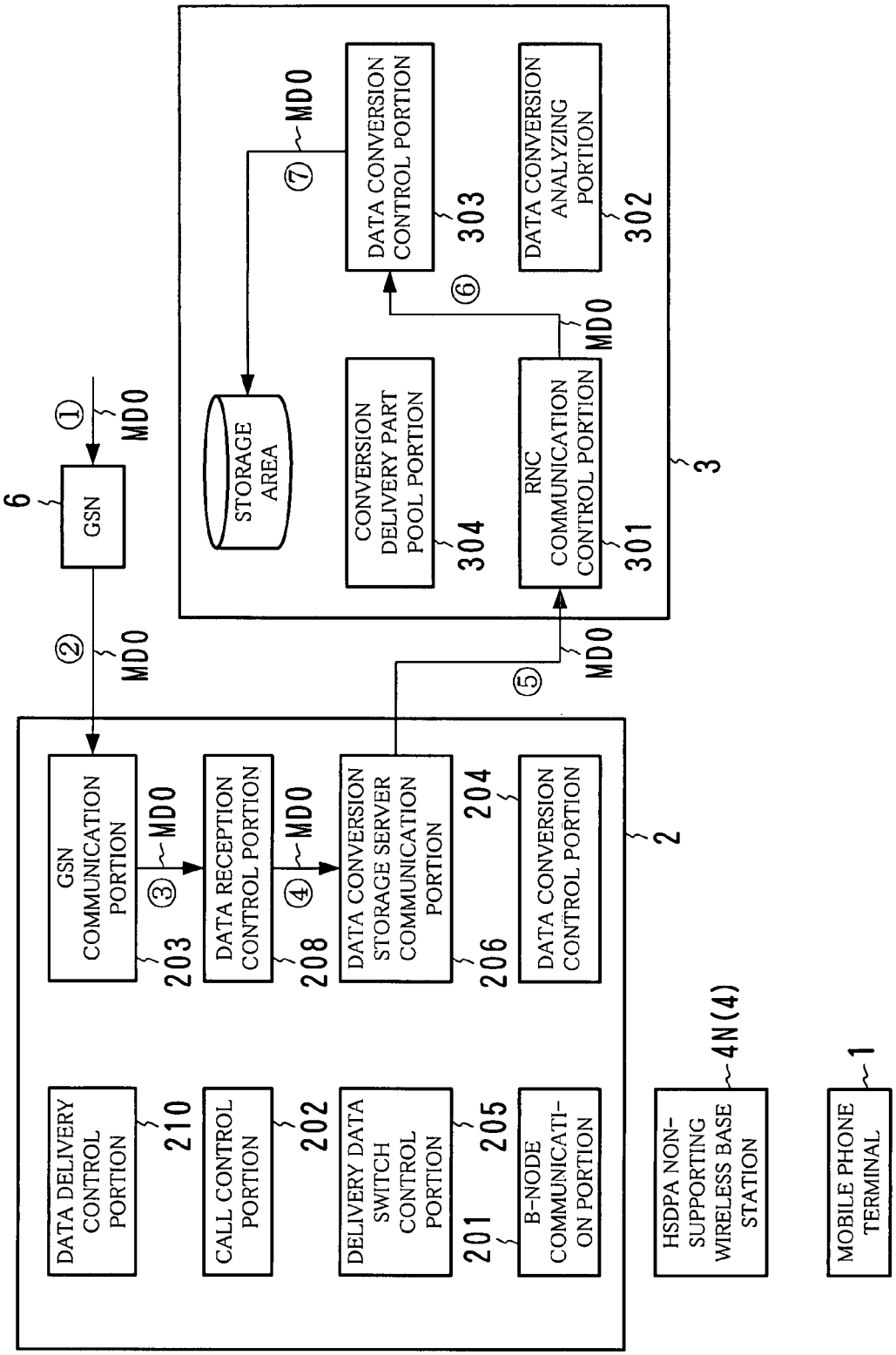
FIG. 11 is a diagram showing another example of the flow of the process of the multimedia data in the period after the detection of the approach of the mobile phone terminal to the HSDPA non-supporting wireless base station until the handover to an HSDPA supporting wireless base station again.

FIG. 10 is a diagram showing an example of a flow of a process of the multimedia data MD0 in the period after detection of the approach of the mobile phone terminal 1 to the HSDPA non-supporting wireless base station 4N until handover to the HSDPA supporting wireless base station 4H again, and FIG. 11 is a diagram showing another example of the flow of the process of the multimedia data MD0 in the period after the detection of the approach of the mobile phone terminal 1 to the HSDPA non-supporting wireless base station 4N until the handover to an HSDPA supporting wireless base station 4H again.

When the call control portion 202 of the base station control unit 2 finishes the preparation for switching the delivering method, it informs the mobile phone terminal 1 of the transmission destination about the switching that will be performed.

Then, individual portions of the base station control unit 2 and the data conversion storage server 3 performs the process as follows by the delivering method selected by the user.

(1) The case where the delivering method selected by the user is "continue with lowered image quality":

When the preparation for switching the delivering method of the multimedia data to the mobile phone terminal 1 that is approaching the HSDPA non-supporting wireless base station 4N is completed, the data conversion control portion 204 and the data delivery control portion 210 perform the process as follows, by a control process performed by the delivery data switch control portion 205 of the base station control unit 2.

The data conversion control portion 204 instructs the data conversion storage server 3 via the data conversion storage server communication portion 206 to perform the process of lowering image quality of the moving image on the multimedia data MD0 to the mobile phone terminal 1. On this occasion, the terminal identification number of the mobile phone terminal 1 is informed to the data conversion storage server 3. Further, a continuing part of the multimedia data MD0 that is continuously sent from the delivery server 5 for the mobile phone terminal 1 is transferred to the data conversion storage server 3.

Then, in the data conversion storage server 3, the data conversion control portion 303 performs the process of codec for lowering image quality of the moving image of the multimedia data MD0 received from the base station control unit 2, based on "delivery bit rate" of the reservation of the mobile phone terminal 1 that is registered in the moving image conversion area reservation database 312 (see FIG. 6). More specifically, image quality of the moving image is lowered to image quality that can be transmitted at the delivery bit rate. It is possible to lower the image quality by decreasing the frame rate or by decreasing the resolution. Hereinafter, the multimedia data MD0 after the process of codec for lowering image quality is referred to as "multimedia data MD1".

The conversion delivery part pool portion 304 sends the multimedia data MD1 to the base station control unit 2 of the transmitter side.

In the base station control unit 2, when the data delivery control portion 210 receives the multimedia data MD1 from the data conversion storage server 3, it stops sending the multimedia data MD0 to the mobile phone terminal 1, and instead sends the multimedia data MD1 to the mobile phone terminal 1.

As described above, the multimedia data is processed in the order indicated by circled numbers shown in FIG. 10 and is delivered to the mobile phone terminal 1. The mobile phone terminal 1 reproduces the multimedia content having lower image quality than before based on the received multimedia data MD1, so as to display the moving image on the liquid crystal panel and produce sounds from the speaker.

(2) The case where the delivering method selected by the user is "receive only sounds":

In this case, process contents of the individual portions are basically the same as the case of "continue with lowered image quality" described above.

However, the data conversion control portion 204 instructs the data conversion storage server 3 to perform the process of cutting the moving image on the multimedia data MD0 to the mobile phone terminal 1.

The data conversion control portion 303 of the data conversion storage server 3 performs a process of codec for cutting off (removing) a part of moving images and leaving a part of sounds on the multimedia data MD0 received from the base station control unit 2. Hereinafter, the multimedia data MD0 after the process of codec for cutting off a part of moving images is referred to as "multimedia data MD2".

Then, this multimedia data MD2 is received by the mobile phone terminal 1 in the order as shown in FIG. 10 in the same manner as the case of "continue with lowered image quality" described above. The mobile phone terminal 1 performs reproduction of only sounds based on the received multimedia data MD2.

(3) The case where the delivering method selected by the user is "store in server":

The data conversion control portion 204 instructs the data conversion storage server 3 to perform a process of storing the multimedia data MD0. On this occasion, in the same manner as the case of "continue with lowered image quality" and "receive only sounds", the terminal identification number of the mobile phone terminal 1 is informed to the data conversion storage server 3. Further, a continuing part of the multimedia data MD0 that is continuously sent from the delivery server 5 for the mobile phone terminal 1 is transferred to the data conversion storage server 3.

The data delivery control portion 210 stops sending the multimedia data MD0 to the mobile phone terminal 1.

In the data conversion storage server 3, the data conversion control portion 303 starts a process of storing the multimedia data MD0 received from the base station control unit 2 in a predetermined storage area. Hereinafter, the multimedia data MD0 stored in the predetermined storage area is referred to as "multimedia data MD3".

The multimedia data MD0 is processed in the order indicated by circled numbers shown in FIG. 11 and is stored in the data conversion storage server 3. The delivery to the mobile phone terminal 1 is stopped. The mobile phone terminal 1 stops reproduction of the multimedia content.

[Reswitch of Delivering Method]

Figure 12:
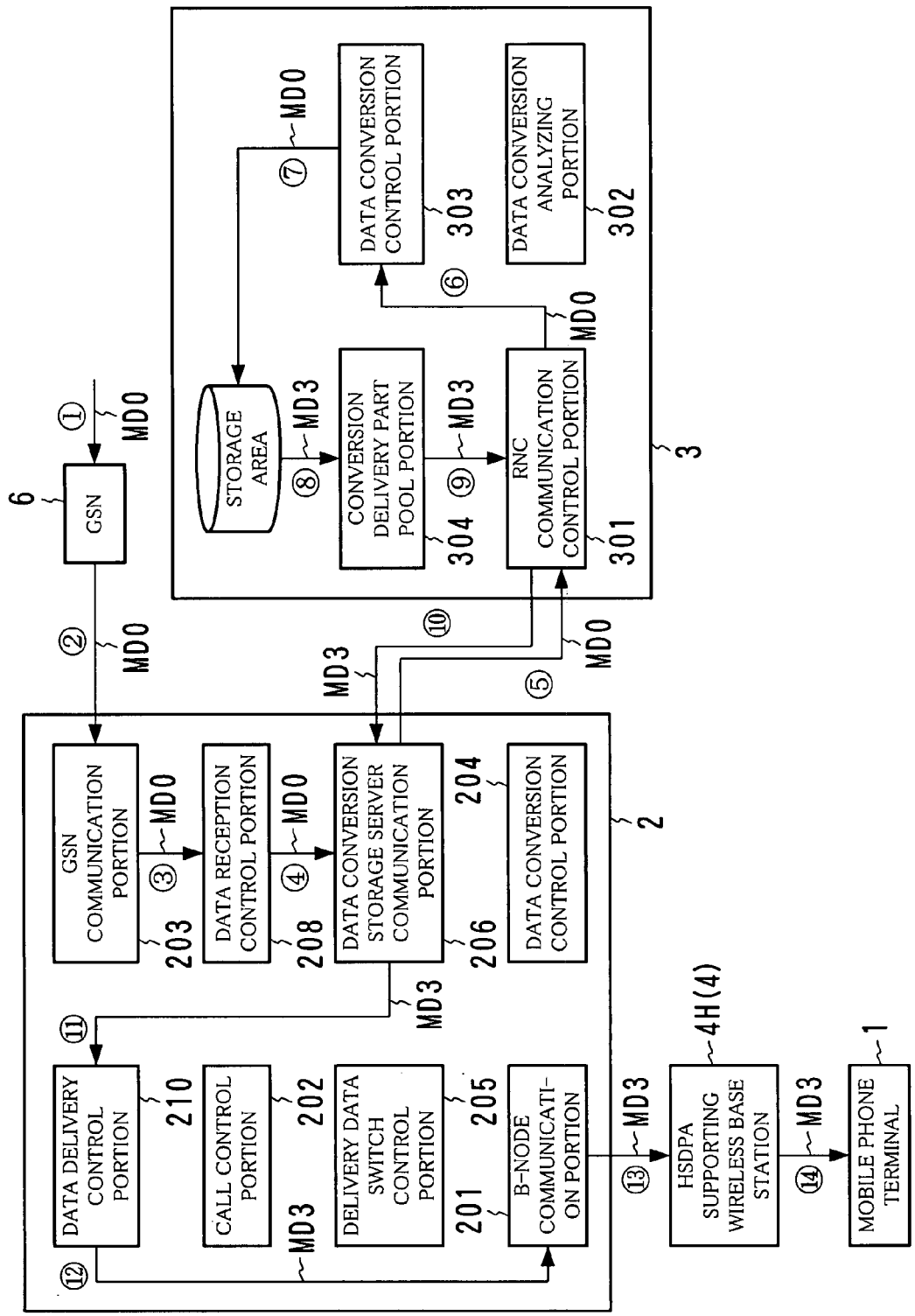
FIG. 12 is a diagram showing an example of a flow of a process of the multimedia data after the mobile phone terminal is handed over to the HSDPA supporting wireless base station again.

FIG. 12 is a diagram showing an example of a flow of a process of the multimedia data MD0 and MD3 after the mobile phone terminal 1 is handed over to the HSDPA supporting wireless base station 4H again.

When it is sensed that the mobile phone terminal 1 that was communicating with the HSDPA non-supporting wireless base station 4N is handed over to the HSDPA supporting wireless base station 4H, the individual portions of the base station control unit 2 and the individual portions of the data conversion storage server 3 perform the process as follows, so that the multimedia data having the original quality is delivered to the mobile phone terminal 1.

(1) The case where the delivering method selected by the user is "continue with lowered image quality" or "receive only sounds":

In the base station control unit 2, when it is sensed that the mobile phone terminal 1 is handed over, the delivery data switch control portion 205 stops transmitting to the data conversion storage server 3 the continuing part of the multimedia data MD0 for the mobile phone terminal 1 that is continuously sent from the delivery server 5. Instead, it controls the data delivery control portion 210 to send the continuing part of the multimedia data MD0 to the mobile phone terminal 1 as it is.

In addition, it notifies the mobile phone terminal 1 that the multimedia content is continued with the original quality again.

In the data conversion storage server 3, the reservation for the mobile phone terminal 1 is released from the moving image conversion area reservation database 312 (see FIG. 6) (i.e., is made vacant), and the process of converting the multimedia data MD0 into the multimedia data MD1 is finished.

Thus, the multimedia data MD0 is processed again in the order of the circled numbers shown in FIG. 9 and is received by the mobile phone terminal 1. Then, the mobile phone terminal 1 reproduces the multimedia content having the original quality.

(2) The case where the delivering method selected by the user is "store in server":

When it is sensed that the mobile phone terminal 1 is handed over, the delivery data switch control portion 205 instructs the data conversion storage server 3 to deliver the multimedia data MD3 that is stored for the mobile phone terminal 1.

Then, in the data conversion storage server 3, the conversion delivery part pool portion 304 starts delivering the multimedia data MD3 stored in a predetermined storage area. The multimedia data MD3 is received by the mobile phone terminal 1 via the RNC communication control portion 301, the data conversion storage server communication portion 206, the data delivery control portion 210, the B-Node communication portion 201 and the HSDPA supporting wireless base station 4H, in the order after the circled number 13 shown in FIG. 12.

The mobile phone terminal 1 restarts the reproduction of the multimedia content based on the received multimedia data MD3 from the stop position of the last time.

After that, when the reproduction of the multimedia content is finished in the mobile phone terminal 1, the reservation for the mobile phone terminal 1 is released from the moving image conversion area reservation database 312 (i.e., is made "vacant").

Figure 13:
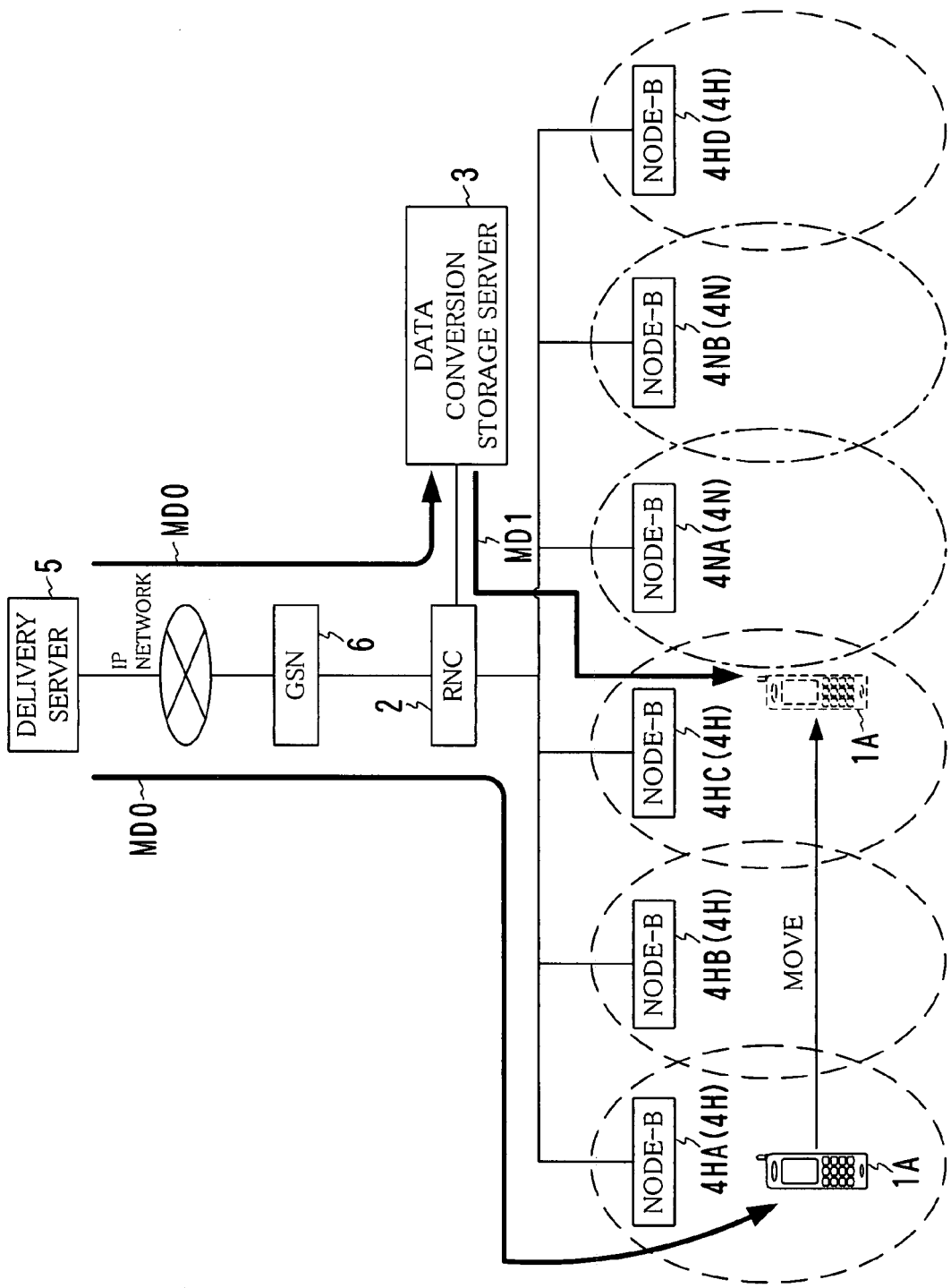
FIG. 13 is a diagram for explaining a change in relaying multimedia data when the mobile phone terminal moves.
Figure 14:
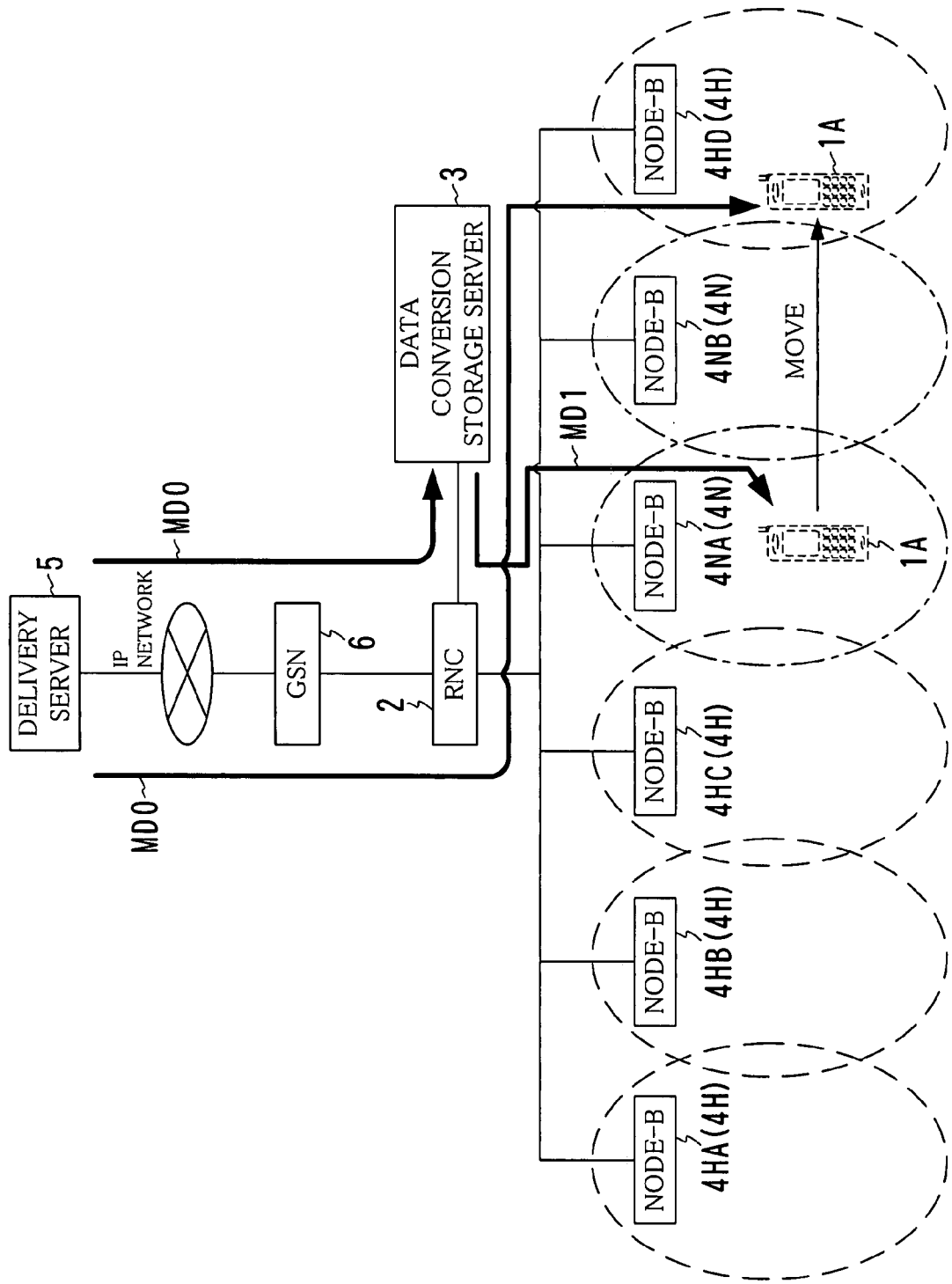
FIG. 14 is a diagram for explaining a change in relaying multimedia data when the mobile phone terminal moves.
Figure 15:
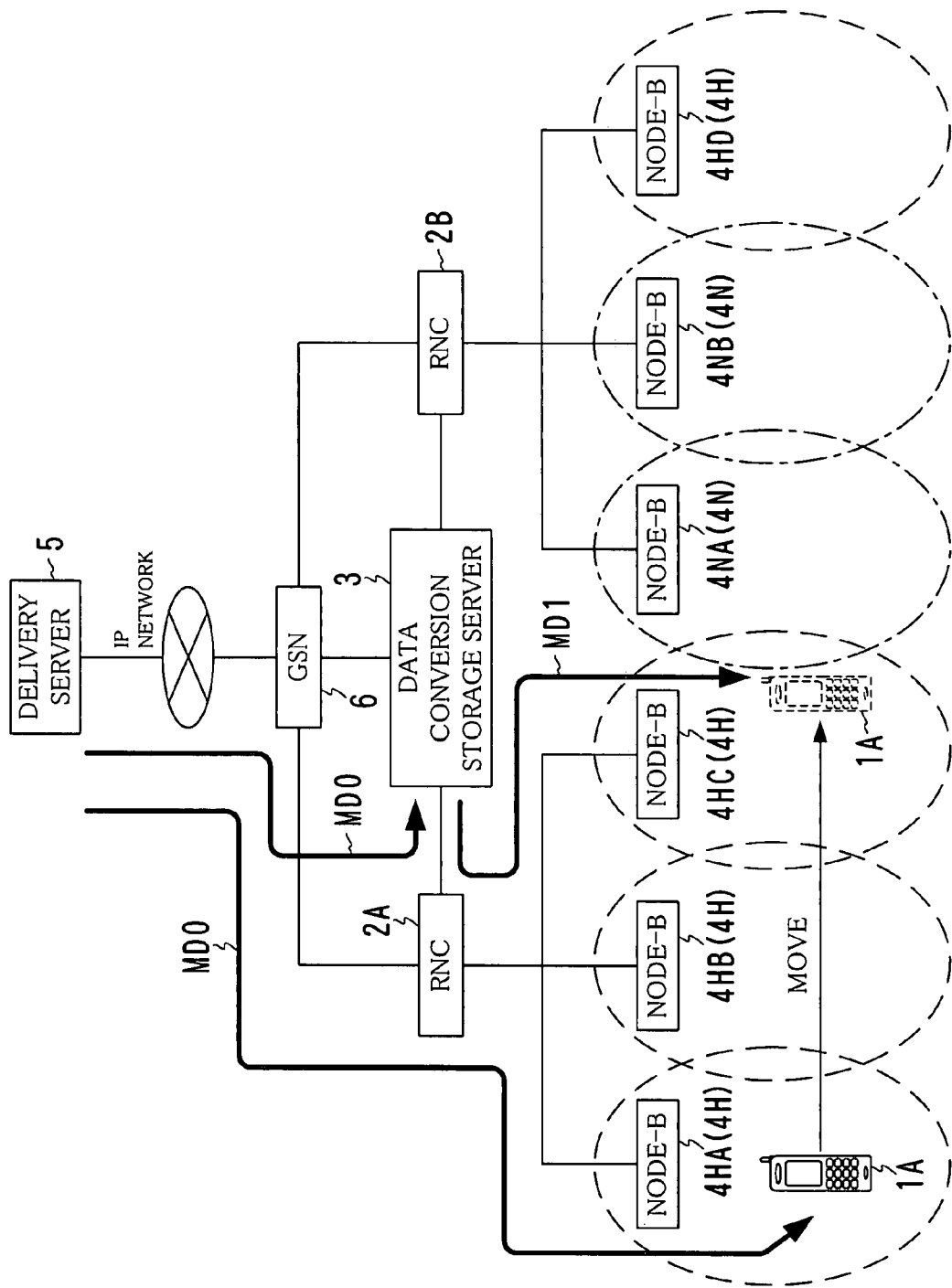
FIG. 15 is a diagram for explaining a change in relaying multimedia data when the mobile phone terminal moves across a plurality of base station control units.
Figure 16:
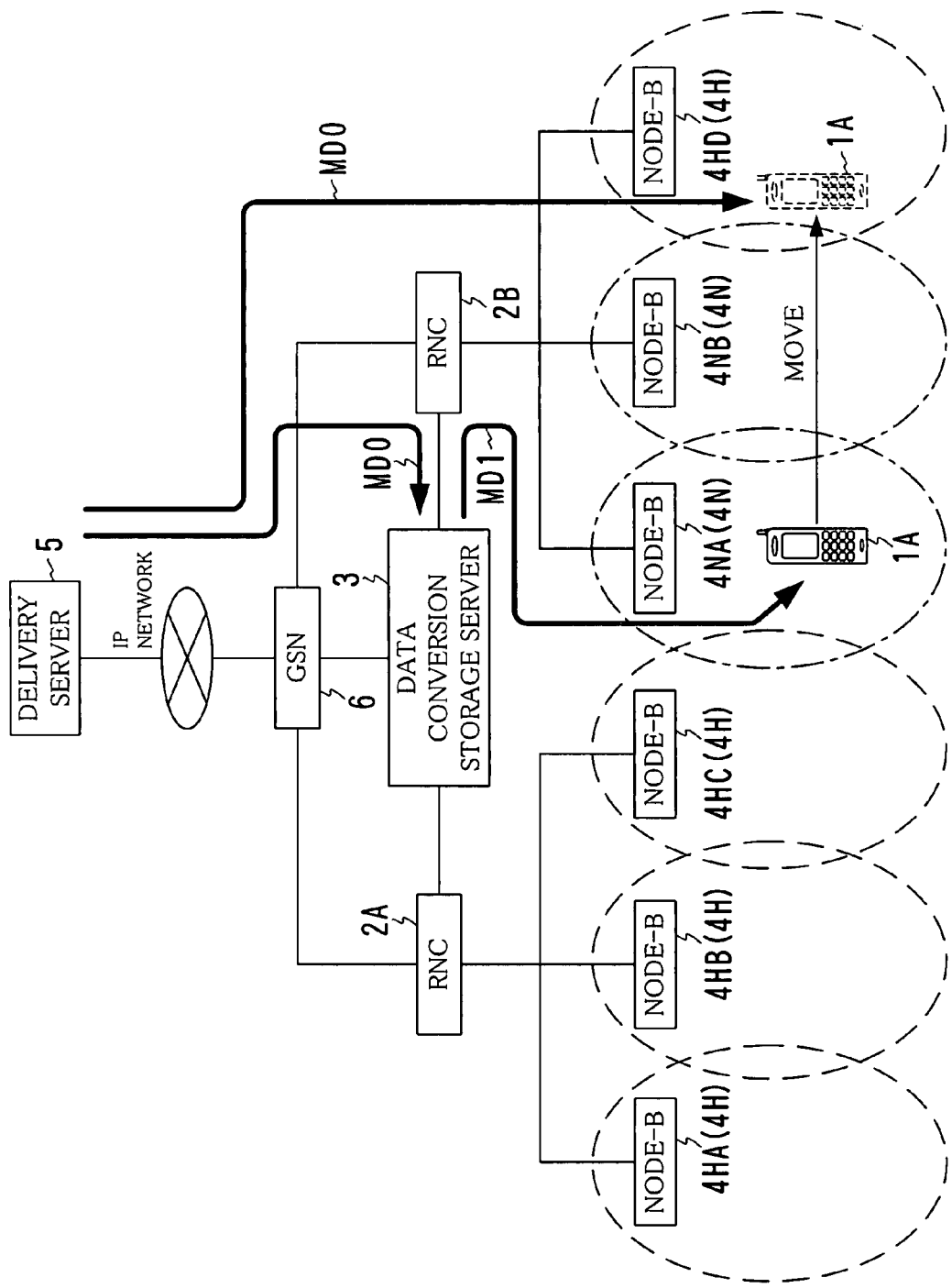
FIG. 16 is a diagram for explaining a change in relaying multimedia data when the mobile phone terminal moves across a plurality of base station control units.

FIGS. 13 and 14 are diagrams for explaining a change in relaying multimedia data MD0 and MD1 when the mobile phone terminal 1 moves, FIGS. 15 and 16 are diagrams for explaining a change in relaying multimedia data MD0 and MD1 when the mobile phone terminal 1 moves across a plurality of base station control units 2.

Next, a change in the delivering method of the multimedia data in the case where a certain user moves while enjoying the multimedia content will be described.

Note that ovals in broken lines in FIGS. 13-16 show cells of the HSDPA supporting wireless base stations 4H while ovals in dashed dotted lines show cells of the HSDPA non-supporting wireless base stations 4N. In addition, the mobile phone terminal 1 of the user is referred to as a "mobile phone terminal 1A". In order to distinguish each of a plurality of HSDPA supporting wireless base stations 4H from others, each of them is referred to as an "HSDPA supporting wireless base station 4HA", an "HSDPA supporting wireless base station 4HB", and so on. It is the same for the HSDPA non-supporting wireless base station 4N.

In FIG. 13, the user operates the mobile phone terminal 1A at a place of a cell of the HSDPA supporting wireless base station 4HA and requests the delivery server 5 to send desired multimedia content. In this case, the user has selected the delivering method when the user moves in a cell of the HSDPA non-supporting wireless base station 4N and sent the information to the base station control unit 2. Hereinafter, the case where "continue with lowered image quality" has been selected will be described.

The delivery server 5 delivers multimedia data MD0 of the multimedia content requested by the user to the mobile phone terminal 1A via the GPRS support node 6, the base station control unit 2 and the HSDPA supporting wireless base station 4HA in the same manner as the conventional system.

Even when the user moves cells in the order of the HSDPA supporting wireless base stations 4HB and 4HC, the multimedia data MD0 is delivered continuously to the mobile phone terminal 1A.

When the user approaches the HSDPA non-supporting wireless base station 4NA, the base station control unit 2 transfers a continuing part of the multimedia data MD0 to the data conversion storage server 3. The data conversion storage server 3 performs a process on the continuing part of the multimedia data MD0 by the delivering method selected by the user (here, the method of continuing the delivery with lowered image quality).

More specifically, the data conversion storage server 3 performs the process of codec for lowering image quality corresponding to the downlink delivery bit rate in the HSDPA non-supporting wireless base station 4NA on the continuing part of the multimedia data MD0 so as to generate the multimedia data MD1. Then, the multimedia data MD1 is delivered to the mobile phone terminal 1A via the base station control unit 2 and the HSDPA supporting wireless base station 4HC.

After that, when the user further moves and enters a cell of the HSDPA non-supporting wireless base station 4NA, the mobile phone terminal 1A is handed over from the HSDPA supporting wireless base station 4HC to the HSDPA non-supporting wireless base station 4NA. Then, the multimedia data MD0 is converted into the multimedia data MD1 in the data conversion storage server 3, and the delivery of the multimedia data MD1 to the mobile phone terminal 1A is continued until the mobile phone terminal 1A is handed over to any one of the HSDPA supporting wireless base stations 4H.

As shown in FIG. 14, when the user further moves and enters a cell of the HSDPA supporting wireless base station 4HD, the mobile phone terminal 1A is handed over from the HSDPA non-supporting wireless base station 4NB to the HSDPA supporting wireless base station 4HD. Thus, the data conversion storage server 3 finishes the process of conversion into the multimedia data MD1. Then, a continuing part of the multimedia data MD0 delivered from the delivery server 5 is received by the mobile phone terminal 1A again not via the data conversion storage server 3.

Note that when the handover is performed, there may be a change of the base station control unit 2 that controls the wireless base station 4 with which the mobile phone terminal 1A communicates. For example, as shown in FIGS. 15 and 16, it changes from the base station control unit 2A to the base station control unit 2B. In this case, when the mobile phone terminal 1A is handed over from the HSDPA supporting wireless base station 4HC to the HSDPA non-supporting wireless base station 4NA, the data conversion storage server 3 should change the delivery of the multimedia data MD1 to the mobile phone terminal 1A via the base station control unit 2A and the HSDPA supporting wireless base station 4HC as shown in FIG. 15 to the delivery via the base station control unit 2B and the HSDPA non-supporting wireless base station 4NA as shown in FIG. 16.

According to the present embodiment, it is possible to deliver the multimedia data from the delivery server 5 to the mobile phone terminal 1 more smoothly than the conventional system so as to provide the content as the user wants also in a mobile communication system where there are mixed HSDPA supporting wireless base stations 4H and the wireless base stations that support only the conventional standard (HSDPA non-supporting wireless base stations 4N).

Although the present embodiment shows the example concerning downlink communication, in uplink communication, i.e., in the case where the mobile phone terminal 1 delivers data, the structure as follows may be adopted.

In the mobile phone system 1KS in which the wireless base stations 4 that support HSUPA (High Speed Uplink Packet Access) and the wireless base stations 4 that do not support HSUPA are mixed, the mobile phone terminal 1 starts to send out the data of a high resolution moving image (e.g., an image obtained by using a video camera function of the mobile phone terminal 1) via the wireless base station 4 that supports HSUPA. When the base station control unit 2 sensed that the mobile phone terminal 1 is approaching a cell of the wireless base station 4 that does not support HSUPA, it informs the mobile phone terminal 1 about it.

Then, the mobile phone terminal 1 continues transmission of the data with lowered resolution of the moving image, after that.

When the mobile phone terminal 1 is handed over to the wireless base station 4 that supports HSUPA, the base station control unit 2 informs the mobile phone terminal 1 about it.

Then, the mobile phone terminal 1 continues the transmission of the data with the original resolution of the moving image (i.e., with high resolution) after that.

Although the present embodiment exemplifies the case in which cells that support W-CDMA high speed communication and cells that do not support the same are mixed, the present invention can be applied to other cases where cells that support high speed communication and cells that do not support the same are mixed in other standard (such as 1xEV-DO, CDMA2000, PHS, wireless LAN or the like).

Although the user selects any one of the methods, i.e., (Method A) to (Method C) before receiving delivery of the multimedia data in the present embodiment, it is possible to adopt another structure in which every time when approaching a cell of the HSDPA non-supporting wireless base station 4N, the user is informed about it so as to select one of the methods.

Although quality of only moving image is lowered in (Method A) of the present embodiment, it is possible to lower quality of sounds, too. Alternatively, data format may be changed so as to reduce the data.

Furthermore, the structure of the entire or each portion of the mobile phone system 1KS, the mobile phone terminal 1, the base station control unit 2 or the data conversion storage server 3, the process contents, the process order, the structure of the database and the like can be modified in accordance with the spirit of the present invention, if necessary.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A data transfer system comprising:
   a processor to control the data transfer system in accordance with processing including
   receiving beforehand designation of one of first data processing, second data processing, and third data processing,
   transferring first data to mobile communication equipment, the first data being transmitted from a server,
   sensing that the mobile communication equipment is approaching a second wireless base station from a first wireless base station when the mobile communication equipment is receiving the first data, and
   after it is sensed that the mobile communication equipment is approaching the second wireless base station from the first wireless base station, stopping transferring the first data to the mobile communication equipment, and instead, in accordance with the designation, performing any one of the following (a) through (c):
   (a) if the first data processing is designated beforehand generating second data having a higher compression ratio than a compression ratio of the first data by applying a specific process on a portion of the first data which has not been transferred yet, and transferring the second data to the mobile communication equipment;
   (b) if the second data processing is designated beforehand, generating third data having a sound component of the first data by applying a process of removing a picture component from the portion and transferring the third data to the mobile communication equipment; and
   (c) if the third data processing is designated beforehand, storing the first data as fourth data.

2. The data transfer system according to claim 1, the processing further including
   sensing that the mobile communication equipment is handed over to the first wireless base station from the second wireless base station, and
   if the third data processing is designated beforehand, and after it is sensed that the mobile communication equipment is handed over to the first wireless base station, transferring the fourth data to the mobile communication equipment.

3. The data transfer system according to claim 1, the processing further including
   sensing that the mobile communication equipment is handed over to the first wireless base station from the second wireless base station, and
   if the first data processing is designated beforehand, and after it is sensed that the mobile communication equipment is handed over to the first wireless base station, stopping transferring the second data but, instead, transferring the first data corresponding to a portion of the second data which has not been transferred yet.

4. The data transfer system according to claim 1, the processing further including
   sensing that the mobile communication equipment is handed over to the first wireless base station from the second wireless base station, and
   if the second data processing is designated beforehand, and after it is sensed that the mobile communication equipment is handed over to the first wireless base station, stopping transferring the third data but, instead, transferring the first data corresponding to a portion of the third data which has not been transferred yet.

5. A data transfer system comprising:
   a processor to control the data transfer system in accordance with processing including
   transferring first data to mobile communication equipment, the first data being data for reproducing a moving image and a sound, and being delivered from a server,
   sensing that the mobile communication equipment is approaching a second wireless base station from a first wireless base station when the mobile communication equipment is receiving the first data, and
   if it is sensed that the mobile communication equipment is approaching the second wireless base station from the first wireless base station, stopping transferring the first data to the mobile communication equipment, generating second data having a size smaller than a size of the first data by removing data of a part for reproducing the moving image from the first data, and transferring the second data to the mobile communication equipment.

6. A data transfer system comprising:
   a processor to control the data transfer system in accordance with processing including
   transferring first data, delivered from a server, to mobile communication equipment,
   receiving beforehand designation of one of first data processing, second data processing, and third data processing,
   sensing that the mobile communication equipment is approaching a second wireless base station from a first wireless base station when the mobile communication equipment is receiving the first data,
   after it is sensed that the mobile communication equipment is approaching the second wireless base station from the first wireless base station, stopping transferring the first data to the mobile communication equipment, and instead, in accordance with the designation, performing any one of the following (a) through (c):
   (a) if the first data processing is designated beforehand generating second data having a higher compression ratio than a compression ratio of the first data by applying a specific process on a portion of the first data which has not been transferred yet, and transferring the second data to the mobile communication equipment;
   (b) if the second data processing is designated beforehand generating third data having a sound component of the first data by applying a process of removing a picture component from the portion and transferring the third data to the mobile communication equipment; and (c) if the third data processing is designated beforehand, storing the first data as fourth data, sensing that the mobile communication equipment is handed over from the second wireless base station to the first wireless base station, and if it is sensed that the mobile communication equipment is handed over from the second wireless base station to the first wireless base station, performing, in accordance with the designation, any one of the following (d) through (f):

(d) if the first data processing is designated beforehand, stopping transferring the second data but, instead, transferring the first data corresponding to a portion of the second data which has not been transferred yet;

(e) if the second data processing is designated beforehand, stopping transferring the third data but, instead, transferring the first data corresponding to a portion of the third data which has not been transferred yet; and (f) if the third data processing is designated beforehand, transferring the fourth data to the mobile communication equipment.

7. A data transfer method used in a mobile communication system the data transfer method comprising:

receiving beforehand designation of one of first data processing, second data processing, and third data processing;

transferring first data to mobile communication equipment, the first data being transmitted from a server;

sensing that the mobile communication equipment is approaching a second wireless base station from a first wireless base station when the mobile communication equipment is receiving the first data; and after it is sensed that the mobile communication equipment is approaching the second wireless base station from the first wireless base station, stopping transferring the first data to the mobile communication equipment, and instead, in accordance with the designation, performing any one of the following (a) through (c):

(a) if the first data processing is designated beforehand, generating second data having a higher compression ratio than a compression ratio of the first data by applying a specific process on a portion of the first data which has not been transferred yet, and transferring the second data to the mobile communication equipment;

(b) if the second data processing is designated beforehand, generating third data having a sound component of the first data by applying a process of removing a picture component from the portion, and transferring the third data to the mobile communication equipment; and (c) if the third data processing is designated beforehand, storing the first data.

8. The data transfer method according to claim 7, further comprising:

preparing a data converting device that is connected to a base station control unit in the mobile communication system via a communication line;

providing the base station control unit with a first processor for transferring selectively the first data, the second data, and the third data; and providing the data converting device with a second processor for generating the second data.

* * * * *